United States Patent
Mertens

(10) Patent No.: US 11,237,318 B1
(45) Date of Patent: Feb. 1, 2022

(54) LIGHT FOR A MOTOR VEHICLE

(71) Applicant: DAIMLER AG, Stuttgart (DE)

(72) Inventor: Jens Mertens, Ostfildern (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 17/295,660

(22) PCT Filed: Oct. 21, 2019

(86) PCT No.: PCT/EP2019/078547
§ 371 (c)(1),
(2) Date: May 20, 2021

(87) PCT Pub. No.: WO2020/104126
PCT Pub. Date: May 28, 2020

(30) Foreign Application Priority Data

Nov. 21, 2018 (DE) ...................... 10 2018 009 248.9

(51) Int. Cl.
| | |
|---|---|
| *F21V 8/00* | (2006.01) |
| *F21S 43/239* | (2018.01) |
| *F21S 43/50* | (2018.01) |
| *F21S 43/15* | (2018.01) |
| *F21S 43/249* | (2018.01) |
| *F21S 43/14* | (2018.01) |

(52) U.S. Cl.
CPC .............. *G02B 6/006* (2013.01); *F21S 43/14* (2018.01); *F21S 43/15* (2018.01); *F21S 43/239* (2018.01); *F21S 43/249* (2018.01); *F21S 43/50* (2018.01); *G02B 6/0036* (2013.01)

(58) Field of Classification Search
CPC ........ B60R 13/005; B60Q 1/0011; B60Q 1/30
See application file for complete search history.

(56) References Cited

U.S. PATENT DOCUMENTS

| | | |
|---|---|---|
| 2,886,911 A | 5/1959 | Hardesty |
| 5,829,177 A | 11/1998 | Hjaltason |
| (Continued) | | |

FOREIGN PATENT DOCUMENTS

| | | |
|---|---|---|
| DE | 3723073 A1 | 1/1989 |
| DE | 8900178 U1 | 2/1989 |
| (Continued) | | |

OTHER PUBLICATIONS

International Search Report dated Feb. 5, 2020 in related/corresponding International Application No. PCT/EP2019/078547.
(Continued)

*Primary Examiner* — Alexander K Garlen
*Assistant Examiner* — Eric T Eide
(74) *Attorney, Agent, or Firm* — Patent Portfolio Builders PLLC

(57) ABSTRACT

A light for a motor vehicle includes a flat light guide with decoupling structures for light on the front side, as well as at least one light source for coupling light into the flat light guide. A graphic is arranged on the rear side of the light guide, the graphic being constructed from regions with different degrees of reflectivity and/or colors. The decoupling structures and the graphic have the same graphical pattern and are oriented in relation to one another. The at least one light source couples the light into the flat light guide on the end face.

11 Claims, 3 Drawing Sheets

(56) References Cited

U.S. PATENT DOCUMENTS

Figure 1:
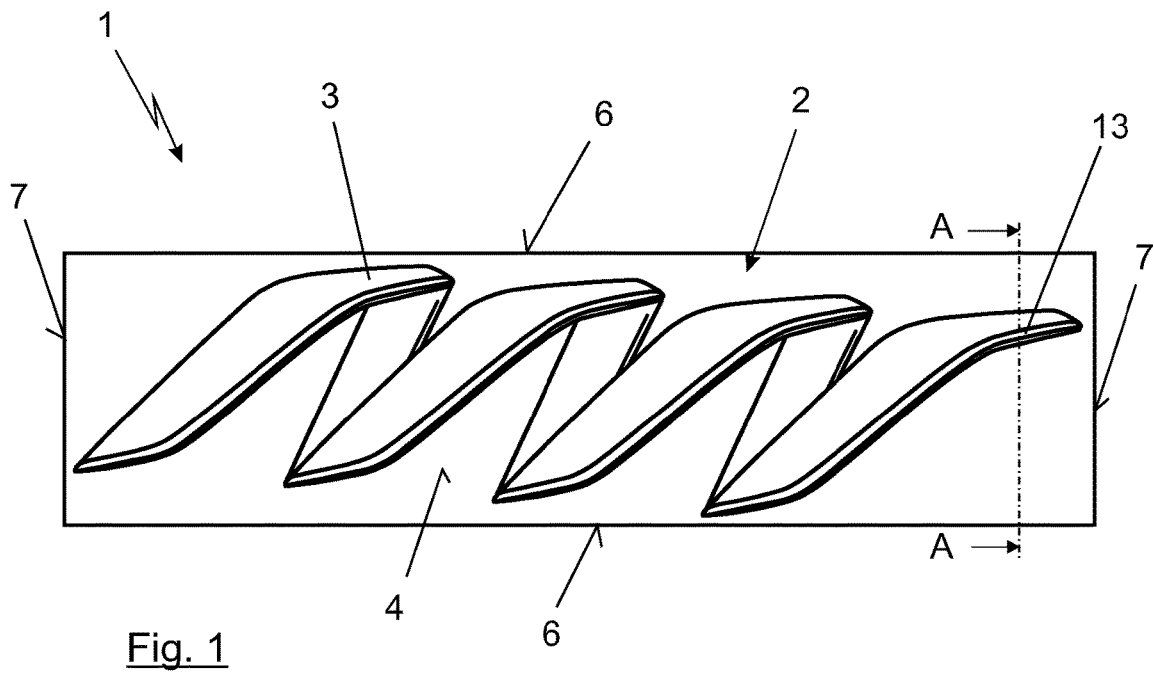

| | | | |
|---|---|---|---|
| 8,915,001 B2 | 12/2014 | Breunig et al. | |
| 9,335,021 B2 | 5/2016 | Massault et al. | |
| 9,423,094 B2 | 8/2016 | Reuschel et al. | |
| 2002/0043012 A1 | 4/2002 | Shibata et al. | |
| 2010/0124074 A1 | 5/2010 | Brychell | |
| 2012/0313392 A1* | 12/2012 | Bingle | B60R 13/005 296/1.08 |
| 2014/0093666 A1* | 4/2014 | Tsuzuki | B60R 13/005 428/31 |
| 2015/0316227 A1 | 11/2015 | Sahlin et al. | |
| 2016/0231493 A1* | 8/2016 | Iordache | G09F 21/04 |
| 2020/0041885 A1* | 2/2020 | Peeters | F21S 41/151 |
| 2021/0041078 A1* | 2/2021 | Park | F21S 43/26 |

FOREIGN PATENT DOCUMENTS

| | | |
|---|---|---|
| DE | 10102774 A1 | 8/2002 |
| DE | 102009005351 A1 | 8/2009 |
| DE | 102011016000 A1 | 10/2012 |
| DE | 102016205408 A1 | 10/2017 |
| DE | 102016118407 A1 | 3/2018 |
| EP | 2776243 B1 | 12/2015 |
| FR | 3019263 A1 | 10/2015 |
| GB | 2304960 A | 3/1997 |
| JP | 2007108438 A | 4/2007 |
| JP | 2015082443 A | 4/2015 |
| TW | M513961 U | 12/2015 |
| WO | 2010118795 A1 | 10/2010 |

OTHER PUBLICATIONS

Office Action created Jul. 2, 2019 in related/corresponding DE Application No. 10 2018 009 248.9.

Written Opinion dated Feb. 5, 2020 in related/corresponding International Application No. PCT/EP2019/078547.

\* cited by examiner

LIGHT FOR A MOTOR VEHICLE

BACKGROUND AND SUMMARY OF THE INVENTION

Exemplary embodiments of the invention relate to a light, in particular a taillight, for a motor vehicle, which has a flat light guide having a front side, a rear side and end faces.

In the automotive field, lights for motor vehicles, such as taillights but also daytime running lights, driving direction indicators or similar, for example, are always subject to stringent requirements in terms of design. In addition to this design request by vehicle manufacturers' marketing and design departments, it is such that the lights, as illumination devices, must also always fulfil legal requirements and must allow a sufficient output of light into the surroundings. Here, the design requirement is increasingly moving into the design of three-dimensional bodies, which are correspondingly illuminated behind cover plates. These three-dimensional "light sculptures" require a lot of construction space, which often constitutes a disadvantage in the vehicle, and which here is correspondingly laborious when producing the corresponding bodywork parts, since the receiving regions for the taillights must be laboriously deep-drawn in several stages, which places particular demands on the material and technology used. This all leads to an increase in costs.

In principle, it is known from the prior art to use light guides of a flat kind, which have a front side and a rear side and end faces and into which light is coupled via at least one light source, often several LEDs as light sources. Then, decoupling structures are provided on the front side for the light, for example in order to achieve a three-dimensional "light sculpture".

In this context, reference can be made by way of example to DE 10 2016 118 407 A1. In this publication, a relatively laborious construction for a light is achieved via a specific light guide with reflective structures introduced into the light guide and via three-dimensional decoupling structures protruding beyond the light guide, which operate permeable regions in an aperture. The production alone of the highly complex light guide is here very cost-intensive. Furthermore, there is also the disadvantage already addressed above of the construction space required that is relatively large in terms of depth.

A further alternative with a light permeable light plate as a cover, in which the entire construction is achieved without an aperture behind this light plate, is described in DE 10 2016 205 408 A1. Here too, the construction is relatively laborious as a result of the complex construction of the decoupling structures on the light guide, which make it a complex three-dimensional component, and as a result of the construction, which requires a very large construction volume, in particular in terms of depth.

US 2015/0316227 A1 forms the generic prior art. There, a flat light guide is described which has decoupling structures for light, and in which the light is laterally coupled in the flat light guide with at least one light source. The light guide there is provided with a reflective film on the rear side, in order to achieve as high a light output as possible.

As further prior art, reference can be made to DE 101 02 774 A1. In this, a display device, in particular for a vehicle, is described. This comprises a flat light guide in which the light is coupled laterally. It is substantially such that only one part of the light shines into the surroundings via a mask, such that numbers or similar can be seen. Similar superstructures are furthermore known from documents DE 89 00 178 U1, U.S. Pat. No. 2,886,911 A, DE 37 23 073 A1 and U.S. Pat. No. 5,829,177 A. As further prior art, reference can moreover be made to US 2010/0 124 074 A1, WO 2010/118 795 A1 and DE 10 2009 005 351 A1.

All lights known up until now, also including the two lights addressed in the prior art by way of example, have the disadvantage that they have completely different design effects in the switched on and switched off state, since the illumination of the complex shape only leads to the desired optical effect in the switched-on state. It is exactly this that constitutes a grave disadvantage, since factoring the lights into the vehicle design typical of the market would require these to cause, as identical as possible or at least virtually, the same optical effect, in particular as identical as possible or at least virtually the same three-dimensional optical effect in the so-called cold design, i.e., when the light is switched off, for example during the day, and in the warm design, when the light is switched on, for example overnight.

Exemplary embodiments of the present invention are directed to an improved light over the prior art that can be achieved with minimal construction space in terms of depth, and which has as similar an optical effect as possible both in the warm design and in the cold design.

Here, the light according to the invention uses a flat light guide having a front side, a rear side and end faces and at least one light source for coupling light into the flat light guide. Decoupling structures for the light are provided on the front side and also partially on the rear side, for example outline contours. The solution according to the invention now provides a graphic on the rear side of the flat light guide, the graphic being constructed from regions with different degrees of reflectivity and/or colors. This flat graphic can display, for example, a three-dimensional perspective depiction, which is formed as a black/white graphic, as a black/red graphic, or as a graphic with highly reflective regions, for example regions vaporized with aluminum, and highly absorbing black regions. The decoupling structures on the front side and the graphic on the rear side, which can be printed on this or laminated on as an image or also can simply be mounted in an adhesive manner or similar behind the flat light guide, are now oriented in relation to one another and correspond to each other in terms of their graphical content. If the light of the at least one light source is now coupled into the flat light guide on the end face side, then the light can be implemented in such a way that it has the same optical impression both in the warm design and in the cold design.

With deactivated light coupling, i.e., when the illumination is switched off, the optical impression of the light is here caused by the reflection of the surrounding light on the more or less strongly reflective regions of the flat graphic. Also, without light coupling, the graphic is thus illuminated by surrounding light, e.g., daylight, falling on the taillight, and its graphical content is thus displayed. With surrounding light that is getting weaker, the light coupling is then activated, for example, by linear light guides or individual discrete light emitting diodes on at least one of the end faces of the flat light guide. Now, the decoupling structures corresponding to the graphic couple the same appearance as those of the graphic and are here supported by the differently strongly reflective graphic parts of the graphic arranged on the rear side.

If the light control is now additionally adjusted to the surroundings brightness, then the respectively accurately identical optical impression of the taillight or the optical graphic stored in it is very surprisingly achieved for the viewer in terms of their subjective perception, regardless of the surrounding light and regardless of whether the taillight is switched on or switched off. This is a significant advantage in terms of the requirements mentioned above.

As a result of the light according to the invention enabling an optical design, which can thus be perceived identically by an observer during the day and during the night, it is also suitable in the context of road traffic regulations and traffic safety to be achieved and as an independent design element typical of the market, along with its primary function as a light, which supports the recognition value of a vehicle.

In particular, a high contrast, such as the use of a black/white graphic, for example, has here proved to be exceptionally efficient, in order to achieve the desired design effect both in the warm design and in the cold design. According to an advantageous development of the idea, a clear transparent or colored cover layer can then be applied in front of the front side of the flat light guide, in order to also generate a red light impression, for example, with a black/white graphic and the use as a taillight and to emit red light into the surroundings in the switched-on state.

As already mentioned, it can be provided according to an advantageous development that the decoupling structures corresponding to the graphic, which are introduced flatly into the front side, are, for example, etched, stamped and/or engraved, depending on whether the flat light guide is implemented as a glass plate or plastic plate.

In addition, it can also be provided with the light according to invention that the decoupling structures have three-dimensional protrusions in individual corresponding regions, to be highlighted, of the graphic. In the sense of this claim, three-dimensional here means that the three-dimensional structures are formed to protrude beyond the original surface of the front side of the light guide differently compared to the etched, stamped and/or engraved structures. Such three-dimensional protrusions, such as wings or fins on the surface of the flat light guide, for example, can be applied on this, in particular retrospectively, for example adhered to this. The light guide then nevertheless remains a relatively simple, extensively flat component which, in addition to the flat etched, engraved, and/or stamped structures, can also have these three-dimensional protrusions. In particular also because of the light coupling on the end face, they can be designed much less deeply than the examples in the prior art, such that the obtained advantage of a very flat construction manner does not have to be, or at least only partially, given up.

As also already indicated, the front side can be provided with a clear transparent or clear colored cover plate, as is generally common with lights, in particular with taillights. The cover plate can be implemented, for example, in the color red that is typical for taillights with homogenous transparency, such that the graphic can be implemented, for example, as a black-white graphic, and the coupling of the light can be carried out attuned to the graphic as a white or cold white or blue-white light, since this enables a correspondingly high light output. The colorfulness is then achieved by the cover plate. In principle, it would also be conceivable to correspondingly vary the graphic and the light in terms of color and to cause the corresponding light radiation either in combination with the color of the cover plate or to use a completely clear color plate, in which the entire light and/or color effect is based on the graphic and the coupled light. This can be interesting, for example, with driving direction indicators, which should have the typical orange color only when switched on. Here, a color deviation between cold design and warm design is, however, accepted, yet the graphical content is nevertheless the same in both cases. Thus, a red light in the cold design, for example, could be used by yellow light as the driving direction indicator.

According to an advantageous development of the idea, the colored cover layer is here applied directly to the front side of the flat light guide, in order to thus achieve a very compact and self-contained construction that is easy to seal in relation to the surroundings.

An exceptionally favorable development of the idea here provides that the at least one light source comprises at least one linear light guide, which is coupled in along one or more of the end faces of the flat light guide. Such a linear light guide can ensure an even light coupling, which can preferably be carried out on one of the longer end faces or, in a substantially squarely elongated or a rectangular design, on the two longer end faces, if the end faces differ in terms of their length. The linear light guide itself can be illuminated, for example, by an LED as the illuminant. Since the graphic is typically also arranged correspondingly to the shape of the light guide with such a design of the flat light guide, for example a rectangular flat light guide, such a coupling on the longer side(s) leads to an ideal illumination in the warm design.

Alternatively, or optionally also in addition to this, it can be provided that the at least one light source is formed as a field or a row of discrete illuminants, in particular light emitting diodes (LED), which can be controlled individually or in groups, and which also couple in light along one or more of the end faces of the flat light guide. Using such a control, a different illumination of different regions of the light can be achieved. Thus, for example for illustrating a braking delay of the vehicle, a different illumination of individual regions of the light can be carried out with different intensity. It would also be conceivable to control a row of light sources or a field of light sources in such a way that the light moves in the manner of a chaser light from one side to the other, which can be of interest, for example with a driving direction indicator. The light coupling here can also preferably be carried out as with the linear light guide along one or two of the longer end faces.

As already mentioned above, according to an advantageous development of the idea, it is provided that the light color of the at least one light source is adjusted to the coloring of the graphic, in order to cause the validity of this particularly well, both in the warm design and in the cold design. A graphic made up of black and white regions or also of black and reflective regions can be illuminated, in particular, with a white, cold white or blue-white, which ensures a high light output. If the desired color to be emitted into the surroundings or color to be recognized from the surroundings is an illumination color adjusted differently to that of the graphic or attuned to the graphic, this can be adjusted for the desired result, for example, by the cover plate already addressed and a coloring thereof.

Here, the light can be formed as any kind of light on a vehicle. As already mentioned, it is particularly suitable as a taillight for a motor-vehicle.

Further advantageous designs of the idea are also made clear by means of the exemplary embodiment which is explained below with reference to the figures.

BRIEF DESCRIPTION OF THE DRAWING FIGURES

Figure 2:
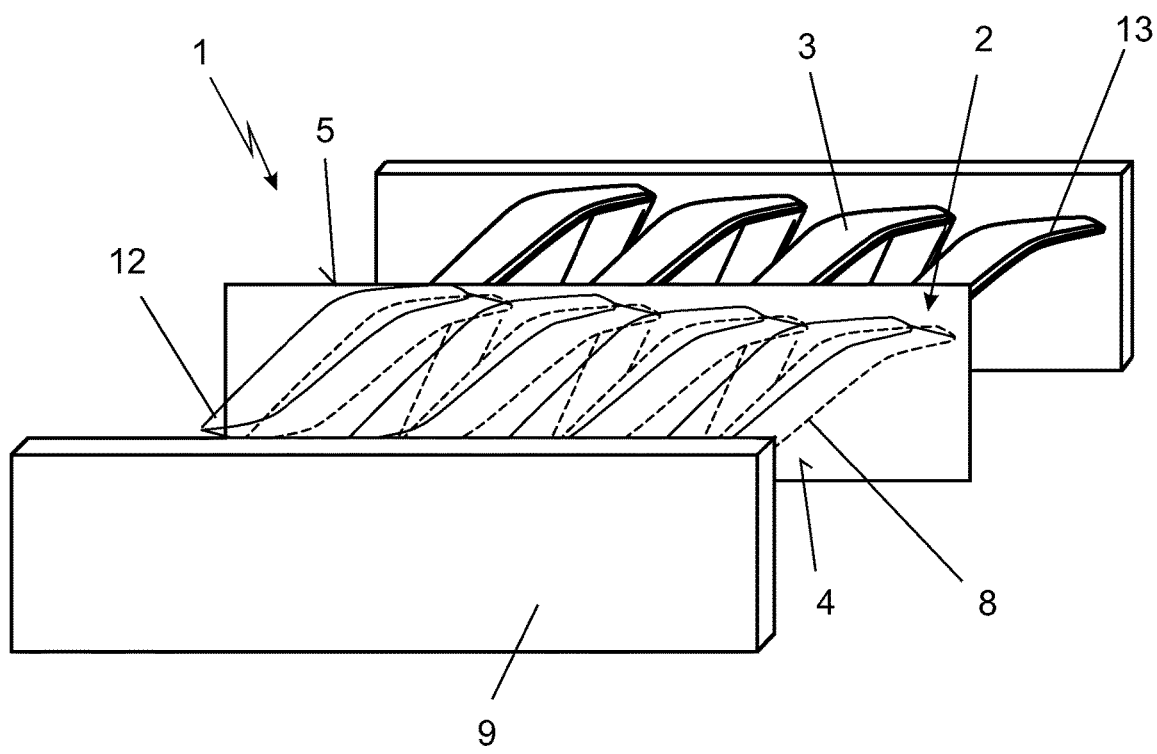
Figure 3:
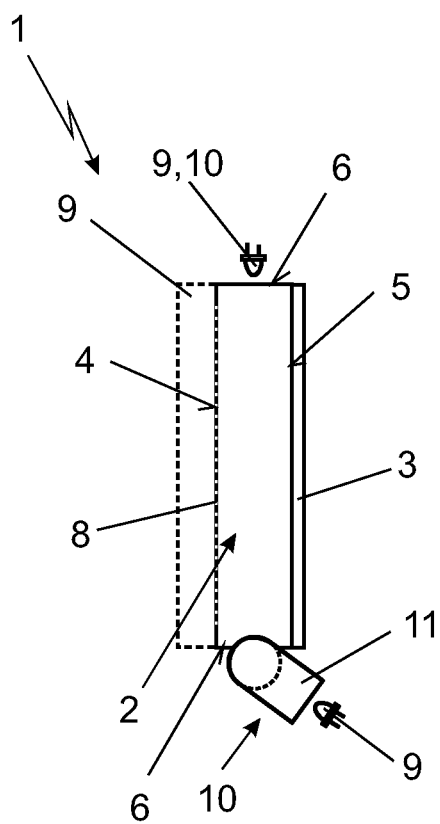
Figure 4:
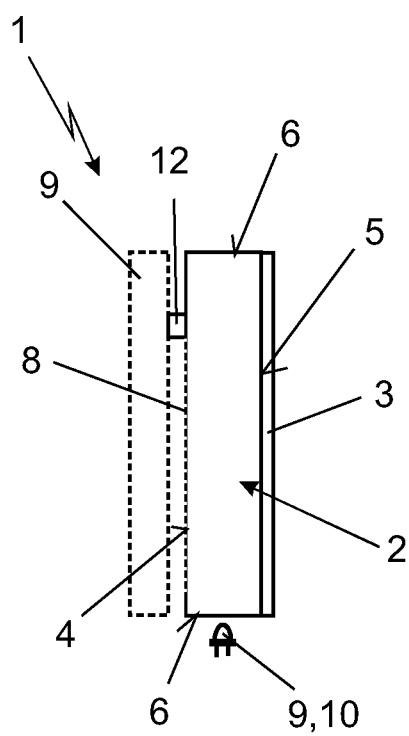
Figure 5:
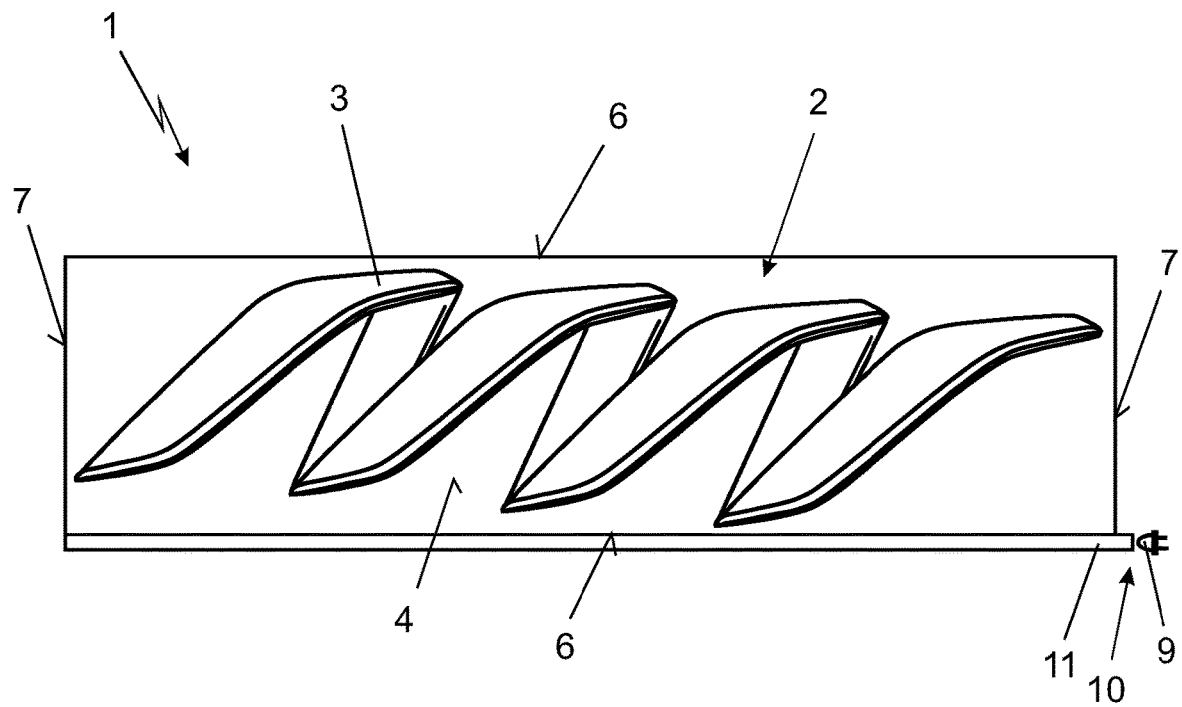
Figure 6:
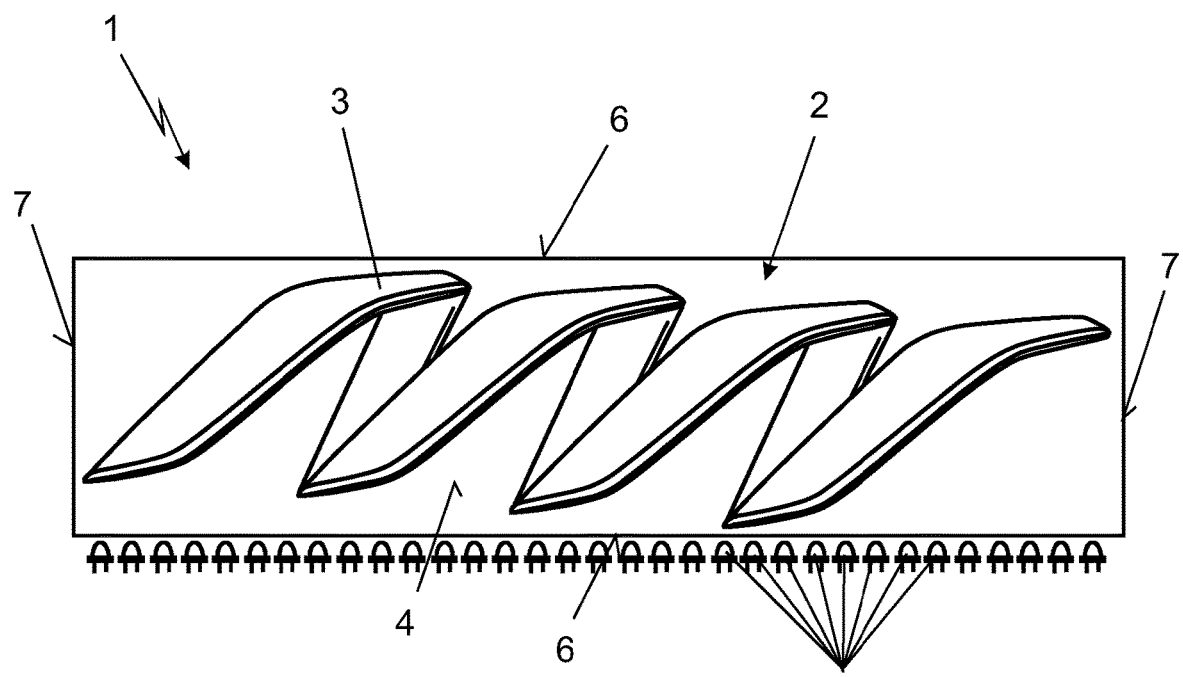

Here are shown:

FIG. 1 a view of a possible embodiment of a light according to the invention;

FIG. 2 the possible embodiment depicted as an exploded depiction;

FIG. 3 a schematic cut through the light from FIG. 1 according to line A-A;

FIG. 4 a depiction analogous to FIG. 3 in an alternative embodiment;

FIG. 5 a light analogous to the depiction in FIG. 1 with a possibility of the light coupling; and FIG. 6 a light analogous to the depiction in FIG. 1 with an alternative possibility of the light coupling.

DETAILED DESCRIPTION

FIG. 1 illustrates a light 1, for example a vehicle light or a taillight for a motor vehicle. The light 1 here comprises a substantially flat light guide element 2, for example a straight or bent plate made of a transparent plastic, of glass or similar. By means of the light 1, a graphical pattern 3 is now to be irradiated into the surroundings or is to be visible from the surroundings independent of an illumination of the light 1. This exemplary abstract graphical pattern 3, which is also referred to below as graphic 3, can, for example, have the appearance of three-dimensionality as a result of graphical means, yet is implemented as a flat image, as is usual with a graphic.

The flat light guide element 2 has a front side 4 facing towards the observer of FIG. 1 and a rear side 5 facing away from the observer not characterized here yet depicted in the figures below. Moreover, in the exemplary rectangular design depicted here, it has two longer end faces 6 and two shorter end faces 7.

The construction is now such that the graphic 3, as can be seen in the sectional depiction according to the line A-A in FIG. 3, is applied to the rear side 5 of the flat light guide element 2. Here, the graphic 3 can be printed directly onto the rear side 5 of the light guide element 2, it can be presented as an individual image and laminated onto the rear side 5 of the light guide element, or it can simply be adhered to the light guide element 2 or connected by means of a mechanical clamp or similar. It is significant that the graphic 3 comes to rest on the rear side 5 of the light guide element 2, such that this graphic 3 can be seen through the light guide element 2 effectively as a protective layer in front of the graphic 3.

Here, the graphic 3 itself is formed with regions of different reflective strengths. The exemplary perspective image of the graphic 3 on the rear side 5 of the light guide 2 here has various reflective properties in different regions. Thus, regions can be vaporized with aluminum, for example, such that a degree of reflection of 85% emerges, they can be designed to be white, which causes a reflection of about 50%, or red, which causes a reflection of about 25%. In contrast to this, black can be used which only has a very low reflection of up to 5%. These image properties and the contrasts of the individual regions then generate the image of the graphic 3, for example the image depicted here or also any other image, in particular also with a perspective image effect, such that the illusion of three-dimensionality emerges, although the graphic 3 itself is formed flatly.

The front side 4 of the flat light guide element 2 opposite the rear side 5 now has decoupling structures 8, which are correspondingly indicated in FIGS. 2, 3 and 4 inside the front face 4. These decoupling structures are designed substantially planarly inside the surface of the front side 4 and can be etched or engraved, for example. In principle, stamping would also be conceivable. It is now significant that the decoupling structures 8 and the image content of the graphic 3 are in accordance with one another and are aligned in relation to one another, such that the decoupling structures 8 respectively adapting in relation to the image of the graphic 3 are arranged directly one above the other when seen in the viewing direction from the front side 4 towards the light 1 or the flat light guide element 2.

An optional yet practically meaningful cover layer 9 can outwardly include the construction of the light 1 on the side of the front side of the light guide element 2, such that the view of the flat light guide element 2 through this cover layer 9 is carried out. When using the light 1 as a taillight, the cover layer 9 can here be colored with a homogenous red tone, for example, and be formed transparently, such that a red light is emitted into the surroundings independent of the coloring of the actual light 1 under it or the design of the light 1 can be seen in red when the light is switched off. Other colors can, of course, also be used. The construction, in particular, for a taillight as the light 1 with a red cover layer 9 here makes it possible to design the graphic 3 as a black-white graphic, for example, and to illuminate with white, for example cold white or also blue-white, light, in order to achieve a correspondingly high light output. As a result of the coloring of the cover layer 9, it then usually leads to the desired red radiation, as is generally known with a taillight, and is required by traffic regulations.

In practice it is such that the surroundings light, for example the daylight or also other surroundings light, ensures that the graphic 3 is illuminated through the transparent flat light guide 2. Without the light 1 being switched on, the desired optical effect of the image of the graphic 3 is thus achieved. Since the decoupling structures 8 are in accordance with the image content of the graphic 3, these do not prevent the view of the graphic, but rather support this by them strengthening the contrasts, such that the image transported by the graphic 3 is very easily visible in the surroundings. If the surroundings of the light 1 now become darker, light is coupled into the flat light guide 2. In particular with light guides with differently long end faces 6, 7, it lends itself to correspondingly couple the light via one of the longer end faces 6 or also via both of the longer end faces 6, in order to achieve as even as possible an illumination of the graphic 3.

By way of example, in the depiction of FIG. 3, two light sources 10 are indicated on the lower longer end face 6 and on the longer upper end face 6. Below, it is an individual light emitting diode 9, which feeds light into a linear light guide 11, which is also indicated in principle in FIG. 5, and which ensures an even illumination of the entire length or width of the flat light guide element 2. Here, in principle, the coupling of one of the longer end faces 6 is sufficient. Depending on the size of the light 1, it can also be useful from both end faces or optionally also from three or four of the end faces 6, 7. The linear light guide 11 as part of the light source 10 can be inserted to fit exactly e.g., into a recess on the end face.

In the example of FIG. 5, only one of the end faces, namely the longer lower end face 6, is correspondingly illuminated. In the example of FIG. 3, the upper longer end face 6 is to be additionally provided with light sources 10. This can be, for example, an individual light diode 9, as depicted here, or a field, in particular, or a row of light diodes 9, as indicated in the depiction of FIG. 6, and which will be elaborated on in more detail later.

In practice, it is such that the view of the graphic 3 or the image content of the graphic 3 becomes increasingly difficult as the surrounding light or daylight increasingly falls away, for example at dusk and during the night, which changes the optical impression of the light 1. Yet if the light is now flatly coupled into the two flat light guides 1 from the end face, then the coupled-in light ensures that it is coupled out on the decoupling structures 8, analogously to the graphical depiction of the image of the graphic 3 below it. Moreover, it results in a strengthening of the light decoupling in the regions of higher reflectivity as a result of the reflecting and absorbing regions of the graphic 3, which further supports the impression and strengthens the depiction of the graphic 3 in the surroundings, not only as a result of the decoupling structures 8 but also in a supportive manner as a result of the graphic 3 applied on the rear side. In practice, this means that the light impression when the light 1 is switched on, in the so-called warm design, is roughly the same as when the light 1 is switched off, in the so-called cold design. In particular when the intensity of the coupled-in light is varied with the surroundings brightness, a practically identical perception independent of the surroundings brightness can be achieved for the viewer of the light 1.

In the depiction of FIG. 4, in a step analogous to that in the depiction of FIG. 3, an alternative design is now shown. The cover layer 9 is here not applied directly onto the front side 4 of the flat light guide 2, but rather arranged at a distance apart, for example. There is a three-dimensional protrusion 12 in this distance as part of the decoupling structures 8, which can specifically highlight an edge of the image content of the graphic 3 labelled with 13 in the depiction of FIGS. 1 and 2. To do so, this protrusion 12 can be provided integrally or, in particular, to be adhered to the flat light guide 2. It then serves the specific strengthening of individual regions, for example the addressed edge 13. Here, the construction is such that the overhang can turn out relatively small, in order to nevertheless achieve an additional light effect of this edge 13, such that the advantage of the attractive constructive size of the light 1 in the direction of the depth T does not get lost or only partly. Otherwise, the construction substantially corresponds to that in FIG. 3 and can be used similarly. Coupling the light in the depiction of FIG. 4 is here also carried out, as in the depiction of FIG. 5, via individual discrete light sources 10 in the form of LEDs 9 on the lower longer end face 6 of the flat light guide 2, in order to illuminate these in the manner already described above, for example when switching on all light sources 10 simultaneously, as can be seen in the depiction of FIG. 6 yet is only partially provided with reference numerals.

The distribution of individual light sources 10, for example as a row or also as a field of light points along the lower and/or upper end face 6, for example, moreover enables a sequential switching on of the light, such that individual portions of the light 1, for example, can be illuminated more strongly than others or optionally also in different colors. This can be used, for example, in order to symbolize the intensity of the braking process when a vehicle is braking. Coupling the light in the manner of a chaser light, such that the light runs in the intended driving direction, for example with a driving direction indicator, would also be conceivable here in principle, since such a sequential control of the individual light sources 10 and thus an only partial illumination of the light 1 is possible as a result of the discrete field or the discrete row of LEDs 9 as light sources 10, different to with the linear light guide 11.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A light for a motor vehicle, the light comprising:
a flat light guide, which has a front side, a rear side and end faces;
decoupling structures for light arranged on the front side of the flat light guide;
at least one light source arranged to output light into one of the end faces of the flat light guide; and
a graphic arranged on the rear side of the flat light guide, wherein the graphic is constructed from regions with different degrees of reflectivity or colors, and wherein the decoupling structures and the graphic have the same graphical pattern and are oriented in relation to one another.

2. The light of claim 1, wherein the decoupling structures are etched, stamped, or engraved flatly into the front side and rear side.

3. The light of claim 1, wherein the decoupling structures have three-dimensional protrusions in individual corresponding portions of the graphic to be highlighted.

4. The light of claim 1, wherein the front side of the flat light guide is covered with a clear or transparently colored cover layer.

5. The light of claim 4, wherein the cover layer is attached directly to the front side of the flat light guide.

6. The light of claim 1, wherein the at least one light source has a linear light guide, which couples in light along one or more of the end faces of the flat light guide.

7. The light of claim 6, wherein a first one or two of the end faces are longer than a second one or two of the end faces, and wherein the light is coupled via the first one or two of end faces of the flat light guide.

8. The light of claim 1, wherein the at least one light source is a field or a row of discrete light emitting diodes, which are controllable individually or in groups, and which couple in light along one or more of the end faces of the flat light guide.

9. The light of claim 8, wherein a first one or two of the end faces are longer than a second one or two of the end faces, and wherein the light is coupled via the first one or two of end faces of the flat light guide.

10. The light of claim 1, wherein a color of light emitted by the at least one light source is adjusted to a coloring of the graphic.

11. The light of claim 1, wherein the light is a motor vehicle taillight.

\* \* \* \* \*